United States Patent [19]

Rigler et al.

[11] Patent Number: 4,618,468
[45] Date of Patent: Oct. 21, 1986

[54] METHOD FOR CONTROLLING BEAD SIZE IN THE PRODUCTION OF EXPANDABLE STYRENE POLYMERS BY SUSPENSION POLYMERIZATION

[75] Inventors: Josef K. Rigler, Recklinghausen; Horst Leithäuser, Marl, both of Fed. Rep. of Germany

[73] Assignee: Chemische Werke Hüls Aktiengesellschaft, Marl, Fed. Rep. of Germany

[21] Appl. No.: 644,451

[22] Filed: Aug. 27, 1984

[30] Foreign Application Priority Data

Sep. 1, 1983 [DE] Fed. Rep. of Germany ....... 3331570

[51] Int. Cl.$^4$ ............................. C08J 9/14; C08J 9/20; C08J 9/22; C08F 2/20
[52] U.S. Cl. ........................................ 264/53; 264/51; 264/DIG. 5; 264/DIG. 9; 264/DIG. 15; 521/56
[58] Field of Search ............... 521/56, 84, 95; 264/53, 264/DIG. 15, DIG. 9, 51, DIG. 5

[56] References Cited

U.S. PATENT DOCUMENTS

| 2,888,410 | 5/1959 | Buchholz ........................ 521/56 X |
| 3,222,343 | 12/1965 | Ingram et al. . |
| 3,265,642 | 8/1966 | Hatano et al. ...................... 521/56 |
| 3,265,643 | 8/1966 | Hatano et al. ...................... 521/56 |
| 3,386,926 | 6/1968 | Gavoret ............................... 521/56 |
| 3,657,162 | 4/1972 | Finestone et al. .................... 521/56 |
| 3,696,060 | 10/1972 | Burt ...................................... 521/56 |
| 3,755,209 | 8/1973 | Nintz et al. .......................... 521/56 |
| 3,835,073 | 9/1974 | Thimas ................................. 521/56 |
| 3,923,706 | 12/1975 | Uebelhart et al. .................... 521/56 |
| 4,036,794 | 7/1977 | Keppler et al. . |
| 4,129,706 | 12/1978 | Keppler et al. ................... 521/56 X |
| 4,174,427 | 11/1979 | Davis et al. ......................... 521/56 |
| 4,497,911 | 2/1985 | Rigler et al. ........................ 521/56 |
| 4,497,912 | 2/1985 | Reese et al. ..................... 521/56 X |
| 4,525,485 | 6/1985 | Maeda et al. .................... 521/56 X |

FOREIGN PATENT DOCUMENTS 2510937 9/1976 Fed. Rep. of Germany .
2079991 11/1971 France .
1226959 3/1971 United Kingdom .

Primary Examiner—Philip Anderson
Attorney, Agent, or Firm—Wells & Wells

[57] ABSTRACT

A process for controlling bead size in the production of expandable styrene polymers by suspension polymerization is carried out by adding protective colloids to the aqueous phase before polymerization begins, such protective colloids being used which are homogeneously soluble in water over the entire temperature range from 25° to 125° C. and in which the concentration range being employed shall not lower the boundary surface tension water/styrene below 18 N/mm$^2$. Lastly, the protective colloids are selected according to their molecular weight and the weight ratio of aqueous to organic phase lies in the range of 0.9:1 to 1:1.25, preferably in the range of 1:1. A grain spectrum is maintained predominantly greater than 0.41 to less than 2.5 mm by varying the molecular weights of the protective colloids.

14 Claims, No Drawings

METHOD FOR CONTROLLING BEAD SIZE IN THE PRODUCTION OF EXPANDABLE STYRENE POLYMERS BY SUSPENSION POLYMERIZATION

CROSS REFERENCE TO RELATED APPLICATIONS

Reference is made to copending application Ser. No. 644,253, of Horst Leithäuser and co-inventors Josef Karl Rigler and Dirk Reese, filed on the same day as the present application and having the title "Process for Controlling Bead Size in the Production of Expandable Styrene Polymers By Suspension Polymerization", which discloses a related method for controlling grain size by varying the concentration of metal ions in the polymerization mixture.

BACKGROUND OF THE INVENTION

The field of the invention is the manufacture of expandable styrene polymers by suspension polymerization and the present invention is particularly concerned with the control of the size and shape of the expandable styrene beads produced.

The state of the art of expandable polystyrene may be ascertained by reference to the Kirk-Othmer "Encyclopedia of Chemical Technology," 2nd Edition, Vol. 9 (1966), under the section entitled "Foamed Plastics", pages 847–884, particularly pages 852, 853 and 855, where polystyrene is disclosed and Vol. 19 (1969) under the section entitled "Styrene Plastics," pages 85–134, particularly pages 116–120, where polystyrene foams are disclosed and pages 120, 120 where prior art self-extinguishing polystyrene foams are disclosed, as well as reference to U.S. Pat. Nos. 4,228,244 and 4,337,319, the disclosures of which are incorporated herein by reference.

U.S. Pat. No. 4,228,244 is incorporated by reference to show the process steps necessary to manufacture molded foam bodies. According to this process, the fine particulate styrene polymers are first heated by means of steam or hot gases to temperatures above their softening points, whereby foaming takes place into discrete particles. This procedure is denoted as pre-foaming. The pre-foamed polystyrenes are then temporarily stored and later further expanded by additional steam heating in a pressure-resistant mold whereby the particles weld into one another to a molded body corresponding to the inside cavity of the mold. This second procedure is denoted as final foaming. The molded object, after final foaming, is cooled inside the mold until the inside temperature drops below the softening point. When the molded object is prematurely removed from the mold, the object deforms. As foam plastics are good insulators, relatively long cooling times are required to cool the mold. The time interval allowing the earliest removal of the molded object without deformation is ordinarily called the "minimum mold dwell time."

U.S. Pat. No. 4,337,319 is incorporated by reference to show the preparation of self-extinguishing, fine particulate, expandable styrene polymers for the manufacture of molded articles.

The state of the art of controlling the size and shape of expandable styrene beads during bead polymerization or suspension polymerization may be ascertained by reference to U.S. Pat. Nos. 3,222,343 and 4,036,794; British Pat. No. 1,226,959; French Pat. No. 2,079,991; West German Published Application No. 2,510,937; the Trommsdorf and Meunster article in Schildknecht: Polymer Processes, Vol. 29, pp. 119–120; Houben-Weyl, Methoden der Organischen Chemie, 4th Edition, Vol. XIV, part 1, pp. 422 and 425; the Winslow and Matrayek article in Industrial and Engineering Chemistry, Vol. 43 (1951), page 1108, and the article by H. Wenning entitled "On the Colloidal Chemistry of Bead Polymerization" as published in Kunststoffe-Plastics, Vol. 5, (1958), pp. 328–340, the disclosures of which are incorporated herein by reference.

Essentially expandable or foamable styrene polymers are produced by the process of bead polymerization or suspension polymerization in the aqueous phase. Conventional present day suspension stabilizers are water-soluble organic polymers, which are designated as protective colloids. Again, fine particulate powders, for instance calcium or barium sulfate or calcium phosphate, are useful to stabilize the suspension. Such stabilizer systems are known as Pickering stabilizers. A list of commercially employed protective colloids can be found for instance in the Trommsdorf & Muenster article in Schildknecht: Polymer Processes, Vol. 29, pp. 119–120.

The following are reasons why the selection of suitable protective colloids assumes importance:

(1) Controlling narrow grain distributions of defined sizes

Depending on bead size, foamable styrene polymers are used for different applications: coarse beads (2.5 to 0.8 mm) are used in the manufacture of insulating panels and finer fractions (0.8 to 0.4 mm in diameter) are used for making packing materials. It is, accordingly, necessary that the beads always be produced within the desired range of grain size in adequate amounts, that is, in high yields. The production of excessively large or excessively small grains is maintained as low as possible.

(2) Low internal water content of beads

It is known that a certain amount of water is always included in the beads in the conventional suspension polymerization. Polymers with a low content of included water evince a uniform foam structure when foamed, whereby the thermal insulation of the foam panels is positively affected. Therefore the lowest possible content in included water (inner water) is sought.

(3) Spherical shape of beads

Due to improved processing, deformed beads are sought when suspension polymerizing of styrene is carried out free of expanding agents. However, the beads should be as spherical as possible when expandable styrene polymers are being produced.

(4) Sufficient suspension stability over the entire polymerization cycle

The suspension used in the production of expandable styrene polymers is even more unstable than that of styrene polymers free of expanding agents. Considering the present day conventional sizes of reactors, up to 100 m$^3$, the loss of one batch represents substantial economic loss. Therefore, the phase separation should proceed so slowly, in the event of malfunction, that enough time remains to add a polymerization inhibitor.

None of the suspension systems known to the prior art meet all of the above requirements simultaneously. There have been many attempts to find a suitable way to meet all four requirements at the same time. As shown by the state of the art, these endeavors, however, have remained unsuccessful.

U.S. Pat. No. 4,036,794 discloses a method wherein suspension stabilizers are used which were prepared by radical polymerization from styrene in the presence of polyvinyl pyrrolidone.

West German Published Application No. 2,510,937 discloses a method wherein the initially low viscosity system is slightly stabilized with tricalcium phosphate and the post stabilization takes place with an aqueous solution of polyvinyl pyrrolidone several hours later.

Both methods strive to produce styrene polymers with low contents of inner water. However, these methods incur the drawback that the polymer grain size is determined by the time of addition of the organic protective colloid.

It is difficult to precisely determine the polymerization degree with heterogeneous mixtures as are present in suspension polymerization. However, precise knowledge of the degree is required for reproducibly adjusting the grain spectra, because the bead size depends on the particular viscosity of the polymerizing phase at which the protective colloid is being added. Furthermore the polymerizing system stays in an unsafe operational condition for about 2 hours, which represents a special drawback when using large scale reactors. Any malfunction, for instance agitator failure, especially failure at the onset of polymerization, can result in reactor destruction.

British Pat. No. 1,226,959 discloses using two protective colloids, namely polyvinyl alcohol with a different degree of hydroxylation in order to obtain uniformly large, round beads. As shown by the examples of British Pat. No. 1,226,959, this requires selecting the ratio of styrene to water in such an unfavorable manner that the method becomes uneconomical. This method makes no contribution to properly controlling the grain size of beads.

As mentioned initially, inorganic, water-insoluble powders are also used as suspension stabilizers. The use of calcium phosphates is most common. As a rule these inorganic compounds are used in combination with small amounts of emulsifiers or surfactants as disclosed in Houben-Weyl, Methoden der organischen Chemie, 4th Edition, Vol. XIV, part 1, Macromolecular Substances, p 425. However, these systems are used in a limited way as compared to the organic protective colloids because reproducible handling and problem-free suspension polymerization are possible only within a restricted range. The Houben-Weyl reference states in this respect, on page 422, last paragraph, lines 6 through 8, as follows: "It is next to impossible to state conditions under which a pulverulent dispersant would be suitable for a wider application". Precise dosage must be observed when inorganic compounds are combined with surfactants because coagulation results from both excessive and insufficient doses of the surfactant.

French Pat. No. 2,079,991 further discloses how to change the bead shape both by the amount of the suspension medium (protective colloid), or by varying the phase ratio of the aqueous to the organic phases and by using a mixture of an organic protective colloid and an inorganic suspension stabilizer. Spherical beads are not necessarily obtained from this procedure, nor beads with a low inner water content, because the dispersing agent is not added to the aqueous phase before polymerization. When the dispersing agent is added at the beginning of the polymerization, the grain size cannot be reproducibly set.

Again, the similar method of U.S. Pat. No. 3,222,343 fails to meet the four conditions listed above.

SUMMARY OF THE INVENTION

Having in mind the limitations of the prior art, it is an object of the present invention to develop a process for controlling the grain size in the suspension polymerization of styrene, wherein the suspension is stable over the entire polymerization cycle, whereby expandable beads with low inner water content and spherical shape are obtained, and wherein fine or coarse bead fractions are produced in high yields within the grain sizes from 0.41 to 2.5 mm.

This object is achieved in a process for polymerizing styrene alone or in mixture with comonomers in an aqueous suspension in the presence of organic protective colloids, radical forming initiators, and expanding agents, where:

(a) the organic protective colloids are dissolved in the aqueous phase, these organic protective colloids being homogeneously soluble in the aqueous phase in the temperature range of 25°–125° C.;

(b) the boundary surface tension between the aqueous phase and the subsequently added organic (styrene) phase also containing the radical forming initiators is maintained above 18 N/mm$^2$;

(c) the molecular weight of the organic protective colloids is selected to produce a given spectrum of grain sizes where higher molecular weights of the same macromolecular compound result in a finer grain spectrum than do lower molecular weights;

(d) the weight ratio of the aqueous phase to the organic phase lies in the range of 0.9:1 to 1:1.25, preferably it lies in the range of 1:1; and (e) the suspension polymerization is carried out.

In order to produce a grain spectrum of predominantly greater than 0.41 mm to less than 2.5 mm the concentration of the organic protective colloids is maintained at 0.01 to 0.3 part/100 parts of H$_2$O.

Also, the molecular weight of the organic protective colloids, for this concentration range, is maintained at a K value of 15 to 100.

In the specific examples of the present invention, the organic protective colloids used are hydroxyethyl cellulose (HEC) and polyvinyl pyrrolidone (PVP).

In order to obtain the grain spectrum predominantly greater than 0.41 mm and less than 2.5 mm, the following concentrations and molecular weights are maintained:

|     | Concentration Range | Molecular Weight Range |
| --- | --- | --- |
| HEC | 0.01 to 0.2 parts/100 parts of H$_2$O | |
| PVP | 0.01 to 0.2 parts/100 parts of H$_2$O | K value = 30 to 90 |

DESCRIPTION OF THE PREFERRED EMBODIMENTS

The following steps are required for success: The protective colloids employed are added to the aqueous phase before polymerization begins. These protective colloids are homogeneously soluble in water and effective throughout the entire temperature range from 25° to 125° C. to which they are exposed. They are used in such a range of concentrations that their addition does not lower the surface tension at the water styrene boundary below 18 N/mm². Lastly, the weight ratio of the aqueous to the organic phases lies in the range of 0.9:1 to 1:1.25, preferably it lies in the range of 1:1. The organic protective colloids are selected depending on the molecular weight. It is precisely the last stated essential criterion which could not be expected from the state of the art.

Thus, it is surprisingly found that protective colloids of higher molecular weights result in a finer grain spectrum than substances of lower molecular weights of the same macromolecular compound. Especially surprising, even when protective colloids of lower molecular weights are used, is the fact that only the desired round spherical bead shape is obtained.

The article by Winslow & Matrayek in "Industrial and Engineering Chemistry", 43 (1951), page 1108, states, however, that when polyvinyl alcohol is used as the protective colloid, the molecular weight only has a subordinate role compared to the degree of hydroxylation. H. Wennig in his research "On the Colloidal Chemistry of Bead Polymerization", as published in "Kuntstoffe-Plastics", 5, (1958), pages 328–340, states on page 330 that the molecular weight of the protective colloid "is without significance either for the surface tension or for the emulsification or for emulsion stability".

Preferably, hydroxyethyl cellulose (HEC) and polyvinyl pyrrolidone (PVP) are used as the protective colloids in the process of the present invention because fractions graded by molecular weight are commercially available without problems. The measure of the molecular weight is either the K-value according to Fikentscher, as disclosed in "Cellulosechemie", 13, (1932), page 58, or the reduced specific viscosity as calculated by the I-value according to DIN (German Industrial Standard) 53,728. These substances are used in concentrations between 0.01 to 0.3 percent by weight referred to the amount of water used, in particular in concentrations between 0.05 and 0.15% by weight. Furthermore, they are clear in water and entirely soluble at the temperatures of polymerization between 25° and 125° C. in the 0.01–0.3% by weight range of concentration. The boundary surface tension between styrene and water is not lowered to less than 18 N/mm² by the addition of the protective colloids.

Because the commercial protective colloids graded by molecular weight do not have a uniform molecular weight but, rather, a molecular weight distribution, it is advantageous to add an inorganic powder hardly soluble in water as the second component in order to improve the control of grain size. High molecular portions of the organic protective colloid are preferredly adsorbed on this fine particulate powder and only the molecular weight fraction desired is effective in the stabilization of the suspension. Useful adsorbents are, for instance, fine particulate tricalcium phosphate or barium phosphate. The weight ratio of the organic protective colloid to the inorganic phosphate powder is between 1:1 and 1:5, especially between 1:2 and 1:4.

Together with the remaining components of the stabilizing system the organic protective colloids are added to the aqueous phase prior to polymerization. The water preferably has an electrical conductivity of less than 0.5 $\mu$s (microsiemens). The organic phase is added with stirring, the system thereupon being heated. As a result, the system is adequately stable at any time during polymerization. If the agitator fails, the separation between the aqueous and organic phases takes place so slowly that enough time is available to add a polymerization inhibitor. Styrene polymers with extraordinarily low inner water contents are obtained. Such contents are between 0.3 and 1.0% by weight.

The grain spectrum desired is adjusted either by using defined fractions of molecular weight of the organic protective colloids alone, or by mixing and using mixtures of fractions. The concentration must always be selected to be high enough that adequate suspension stability is assured during the entire polymerization. The weight ratio of aqueous to organic phases, as already mentioned, is in the range from 0.9 to 1 to 1:1.25, preferably 1:1.

Input materials for the production of the expandable styrene polymers are styrene and monomer mixtures containing at least 50% by weight of styrene and additionally a monomer copolymerizing with styrene, for instance alpha-methylstyrene, p-methylstyrene, nuclear-halogenated styrenes, acrylonitrile, esters of acrylic or methacrylic acid with alcohols having 1 to 8 carbon atoms, N-vinyl compounds such as N-vinylcarbazole, or also lesser amounts of butadiene or divinylbenzene.

The polymerization is carried out by the bead polymerization method at temperatures between 80° and 125° C. Also, it is conventionally initiated during one or more radical forming substances, the conventional amounts of 0.2 to 1.0, in particular 0.3 to 0.6% by weight referred to the organic phase being used: t-butylperbenzoate, 1-butylperisononanate, di-t-butyl peroxide, dibenzoyl peroxide or mixtures thereof are cited illustratively. Furthermore, the styrene polymers may containg organic halogen compounds acting as flame protectants, for instance the brominated oligomers of butadiene or of isoprene. Typical representative substances are: 1,2,5,6-tetrabromocyclododecane; 1,2,5,6,9,10-hexabromocyclododecane; brominated polybutadiene with a degree of polymerization, for instance from 3 to 15; 1-(alpha,beta-dibromoethyl)-3,4-dibromocyclohexane. It is advantageous to also add synergistically active substances such as di-butylperoxide and poly-p-diisopropylbenzene.

Liquid or gaseous organic compounds are used as the expanding agents for the process of the present invention, which do not dissolve the styrene polymer and have boiling points below that of the softening point of the polymer, for instance aliphatic hydrocarbons such as propane, butane, pentane, hexane, cyclohexane or halogen hydrocarbons such as methyl chloride, dichloride-difluoromethane, trichloromonofluoromethane, or 1,2,2-trifluoroethane,1,1,2-trichloroethane. Mixtures of the expanding agents are also useful. Typically the expanding agents are used in amounts of 2 to 20% by weight, preferably 3 to 12% by weight referred to the monomers.

Furthermore, the expandable styrene polymers may contain additives such as dyes, fillers and regulators for the foam porosity such as epoxy alkanes. The expandable styrene polymers following production are in spherical shape and as a rule their particle diameter is from 0.3 to 3 mm, preferably 0.4 to 2.5 mm. They can be foamed further when in the prefoamed state by means of the conventional method of heating in molds which are closed in non-hermetic manner, and thus are sintered into molded foamed bodies corresponding in their dimensions to the inside cavity of the mold used.

1. EXAMPLES

1.1 Polymerization

The premixed mixtures of organic protective colloid and fine particulate tricalcium phosphate are dispersed in an agitator container in 100 parts by weight of fully desalted water. 100 parts by weight of styrene are added with stirring to the dispersion, this styrene containing $I = 1/\eta_{RED}; \eta_{RED} = \eta_{SPEC}/c; \eta_{SPEC} = t/t_o - 1$
$c = 0.002 \text{ g/cm}^3 = $ concentration $\left. \begin{array}{l} t = \text{solution transit time} \\ t^o = \text{solvent transit time} \end{array} \right\}$ through capillary viscosimeter at 25° C.

TABLE 1

Grain size control for batches of hydroxyethyl cellulose of different molecular weights

| Example | Parts by weight of HEC/100 parts by wt of water | I (g/ml) mol wt. | Parts by weight of TCP/100 parts by wt of water | inner water % by weight | yield % (1) | Grain spectrum % mm |     |      |     |      |      |       |
|---------|-------|------|------|------|------|------|------|------|------|------|------|------|
|         |       |      |      |      |      | >2.5 | 2.0  | 1.12 | 0.9  | 0.63 | 0.41 | <0.41 |
| E1      | 0.12  | 675  | 0.25 | 0.83 | 94.9 | 4.3  | 32.3 | 41.5 | 14.5 | 5.2  | 1.4  | 0.8   |
| V1      | 0.10  | 675  | 0.25 | 0.71 | 81.6 | 18.3 | 41.4 | 32.6 | 4.2  | 2.4  | 1.0  | 0.1   |
| V2      | 0.14  | 675  | 0.25 | 1.12 | 84.3 | 0.2  | 2.4  | 10.7 | 18.6 | 34.1 | 18.5 | 15.5  |
| E2      | 0.15  | 485  | 0.30 | 0.56 | 98.9 | 0.1  | 1.4  | 21.4 | 38.5 | 27.2 | 10.4 | 1.0   |
| V3      | 0.12  | 485  | 0.30 | 0.76 | 75.2 | 24.2 | 38.5 | 18.7 | 10.5 | 5.7  | 1.8  | 0.6   |
| V4      | 0.17  | 485  | 0.30 | 0.88 | 83.9 | —    | 2.7  | 10.4 | 28.3 | 22.4 | 20.1 | 16.1  |
| E3      | 0.22  | 170  | 0.35 | 0.44 | 98.0 | —    | —    | 1.4  | 10.5 | 50.7 | 35.4 | 2.0   |
| V5      | 0.20  | 170  | 0.35 | 0.57 | 81.7 | —    | 2.2  | 12.4 | 17.4 | 28.5 | 21.2 | 18.3  |
| V6      | 0.25  | 170  | 0.35 | 0.72 | 84.7 | —    | —    | 2.3  | 18.7 | 35.3 | 28.4 | 15.3  |

(1) % by weight in the desired grain size range from 0.41 to 2.5 mm
HEC = hydroxyethyl cellulose
TCP = tricalcium phosphate
E = Examples of the present invention
V = Control tests
The tricalcium phosphate (TCP) also influences the grain distribution where an increase in the concentration of TCP results in a finer grain spectrum.

0.30 part of dibenzoyl peroxide and 0.15 part of t-butylperbenzoate in dissolved form. This mixture is polymerized for 4 hours at 90° C. and for 6 hours at 115° C. while being stirred. Three hours after reaching 90° C., 7 parts by weight of a mixture of normal and isopentane are added as the expanding agent. After polymerization, the agitation vessel is emptied and the polymer particles are extensively rid of outside water.

1.2 The inner water is determined as follows: a sample of the expandable polystyrene is treated for 2 minutes with methanol to eliminate traces of outside water, then it is evacuated in a suction filter and air at 20° C. is blown on it for 5 minutes. The sample so prepared is then titered by the "Karl Fischer" method.

1.3 Determination of the molecular weight of the protective colloid: A solution of the protective colloid in water at a concentration of 0.002 g/cm³ is prepared in a graduated 100 ml container. This solution is measured in a capillary viscosimeter and compared with the solvent. The specific viscosity is determined from the transit times through the capillary and from them the specific viscosity or the I-value is computed in relation to the concentration. The I-value (g/ml) of the tables is defined according to DIN (German Industrial Standard) 53,728 as follows:

The results listed in Table 1 show that, depending on the desired range of the grain spectrum, a given molecular weight (expressed in terms of the I value specific viscosity) of the protective colloid provides optimal yield in the desired range of grain sizes. The comparison tests show that when a protective colloid is used having a given molecular weight while varying the concentration, the yield of the useful material in the grain size range between 2.5 and 0.41 mm is affected negatively. Thus, the fine particulate proportion obtained in the control tests V2, V4 and V6 cannot be fed back as material to be dissolved again because the adhering quantities of dispersing agents can be removed only with difficulty and, accordingly, interfere with the next batch. In the control tests V1, V3 and V5, the beads larger than 1.5 mm lack circularity (flat disks) and, therefore, the useful yield actually is only respectively 40.2; 36.7, and 79.5%.

The fine particulate proportion of the control tests V7 and V9 of Table 2 cannot be reused, similarly to the case for Table 1 and, as regards the control tests V8 and V10 of Table 2, again beads lacking circularity were obtained beyond a grain size of 1.25 mm, so that the useful yield respectively is 60.8 and 82.4%.

A simple method for adjusting the fine particulate grain spectrum is provided by using mixtures of various fractions of molecular weights. This is made clear by the examples of Table 3:

TABLE 2

Using batches of polyvinylpyrrolidone of different molecular weights

| Example | PVP+ Amount in parts by wt per 100 parts by wt of H₂O | Mol. weight K-value | TCP parts by wt/100 parts by weight of water | Yield (%) ++ | Grain size % mm |      |      |     |      |      |       |
|---------|--------|------|------|------|------|------|------|------|------|------|-------|
|         |        |      |      |      | >2.5 | 2.0  | 1.12 | 0.9  | 0.63 | 0.41 | <0.41 |
| E4      | 0.10   | 90   | 0.10 | 99.8 | 0.2  | 10.4 | 48.5 | 37.5 | 2.4  | 1.0  | —     |
| V7      | 0.11   | 90   | 0.10 | 86.0 | —    | 4.5  | 8.2  | 22.5 | 27.4 | 23.4 | 14.0  |
| V8      | 0.09   | 90   | 0.10 | 80.2 | 19.4 | 48.7 | 24.5 | 3.1  | 2.3  | 1.6  | 0.4   |
| E5      | 0.15   | 30   | 0.15 | 98.2 | —    | —    | 4.4  | 24.6 | 40.5 | 28.7 | 1.9   |
| V9      | 0.16   | 30   | 0.15 | 81.6 | —    | —    | —    | 2.7  | 34.2 | 44.7 | 18.4  |

TABLE 2-continued

Using batches of polyvinylpyrrolidone of different molecular weights

| Example | PVP+ Amount in parts by wt per 100 parts by wt of H$_2$O | Mol. weight K-value | TCP parts by wt/100 parts by weight of water | Yield (%) ++ | Grain size % mm | | | | | | |
|---|---|---|---|---|---|---|---|---|---|---|---|
| | | | | | >2.5 | 2.0 | 1.12 | 0.9 | 0.63 | 0.41 | <0.41 |
| V10 | 0.13 | 30 | 0.15 | 88.8 | 1.2 | 6.4 | 8.5 | 27.3 | 28.5 | 18.2 | 9.9 |

+PVP = polyvinylpyrrolidone
++% by weight in the desired range of grain sizes of 0.41 to 2.5 mm

TABLE 3

Using mixtures with various fractions of molecular weight of hydroxyethyl cellulose (HEC) to control grain size

| Example | Parts by wt of HEC/100 parts by wt of water | HEC1 amount, parts by wt to 100 parts by wt water | I g/ml Mol. wt. | HEC2 Amount, parts by wt to 100 parts by wt water | I g/ml Mol. Wt. | % by wt Yield (%)+ | inner water | >2.5 | 2.0 | 1.12 | 0.9 | 0.63 | 0.41 | <0.41 |
|---|---|---|---|---|---|---|---|---|---|---|---|---|---|---|
| E6 | 0.12 | 0.09 | 675 | 0.03 | 485 | 98.8 | 0.72 | 1.2 | 74.6 | 18.5 | 4.8 | 0.9 | — | — |
| E7 | 0.12 | 0.03 | 675 | 0.09 | 485 | 99.9 | 0.68 | 0.1 | 48.2 | 32.5 | 16.5 | 2.5 | 0.2 | — |
| E8 | 0.27 | 0.17 | 485 | 0.10 | 170 | 99.2 | 0.45 | — | — | 8.2 | 48.5 | 39.2 | 3.3 | — |
| E9 | 0.22 | 0.08 | 485 | 0.14 | 170 | 99.8 | 0.38 | — | — | 0.1 | 18.5 | 54.5 | 26.8 | 0.2 |

In all examples, the tricalcium phosphate is present in 0.3% by weight referred to the aqueous phase
+% by weight in the desired grain size range 0.41 to 2.5 mm The examples of Table 3 clearly show the advantageous application of mixtures of protective colloids with various molecular weights. In all instances the yield in useful beads is nearly 100%. Moreover, the grain size distributions are narrower, i.e., a desired grain size can be better adjusted. The inner moistness of the products in all cases is less than 1% and, hence, satisfactory.

The purpose of the examples of Table 4, below, is to demonstrate the various rates of phase separation of the polymerization batch when the agitator is standing still and depending on the presence or absence of dispersing agents. In case of malfunction, for instance when the agitator fails due to operational difficulties, sufficient time must be available to feed a polymerization inhibitor to the system before there is phase separation.

For this purpose, 5 kg of fully desalted water were placed first into a 15 liter glass flask, and 5 kg of styrene (containing peroxides in the dissolved state and in the amounts listed under Example 1) were added with stirring. After heating to 90° C., polymerization was carried out for 30 minutes. The agitator was shut off and the time until phase separation was determined. Thereupon the batch was discarded. Operation in the Examples of Table 4 was carried out first (1) without using a suspension stabilizer, second (2) by the method described in West German Published Application No. 2,510,937 (prepolymerization with addition of calcium phosphate), and lastly by the methods of the present invention (3) and (4).

TABLE 4

Duration of phase separation for agitator malfunction following 30 minutes of polymerization at 90° C.

| Protective colloid in the aqueous phase | PER | Duration in mintues of the phase separation |
|---|---|---|
| (1) none | | 1 |
| (2) tricalcium phosphate (TCP) | German Published Application 2,510,937 | 5 |
| (3) hydroxyethyl cellulose + | by the present invention | 28 |

TABLE 4-continued

Duration of phase separation for agitator malfunction following 30 minutes of polymerization at 90° C.

| Protective colloid in the aqueous phase | PER | Duration in mintues of the phase separation |
|---|---|---|
| TCP | | |
| (4) polyvinyl pyrrolidone + TCP | by the present invention | 30 |

What we claim is:

1. In a process for the preparation of shaped bodies based on expanded styrene polymers comprising: the polymerization of styrene or a mixture thereof with at least one monomer copolymerizable therewith in an aqueous suspension having an aqueous phase and an organic phase containing said styrene, in the presence of an organic protective colloid and radical forming initiators and expanding agent, pre-foaming of the resulting expandable particles, aging of the foamed particles and molding thereof in a pressure-resistant mold, the improvement comprising:
   (a) dissolving said organic protective colloid in said aqueous phase which has a K value of 15 to 100 and is homogeneously soluble therein in the range between 25° and 125° C. at a concentration of 0.01 to 0.3 part/100 parts of water;
   (b) adding said organic phase containing said initiators to said aqueous phase;
   (c) maintaining a boundary surface tension between said aqueous phase and said organic phase above 18 N/mm$^2$;
   (d) varying the molecular weight of said organic protective colloid as indicated by said K value between 15 to 100;
   (e) maintaining the ratio of said aqueous phase to said organic phase greater than 0.9:1; and
   (f) polymerizing the mixture so prepared.

2. The process of claim 1, wherein said protective colloid is selected from the group consisting of hydroxyethyl cellulose, and polyvinyl pyrrolidone.

3. The process of claim 2, further comprising an inorganic powder insoluble in water associated with said protective colloid.

4. The process of claim 3, wherein said inorganic powder is tricalcium phosphate.

5. The process of claim 1, further comprising the addition of flame-retardant compounds.

6. The process of claim 2, wherein said protective colloid is polyvinyl pyrrolidone in a concentration of 0.01 to 0.2 part/100 parts of water having a k value of 30 to 90.

7. The process of claim 2, wherein said protective colloid is hydroxyethyl cellulose in a concentration of 0.01 to 0.2 part/100 parts of water.

8. In a method for controlling bead size in the production of expandable styrene polymers by polymerizing styrene alone or in mixture with comonomers in an aqueous suspension having an aqueous phase and an organic phase containing styrene in the presence of an organic protective colloid and radical forming initiators and expanding agents, the improvement comprising:
  (a) dissolving said organic protective colloid in said aqueous phase which has a K value of 15 to 100 and is homogeneously soluble therein in the range between 25° and 125° C. at a concentration of 0.01 to 0.3 part/100 parts of water;
  (b) adding said organic phase containing said initiators to said aqueous phase;
  (c) maintaining a boundary surface tension between said aqueous phase and said organic phase above 18 N/mm2;
  (d) varying the molecular weight of said organic protective colloid as indicated by said K value between 15 to 100;
  (e) maintaining the ratio of said aqueous phase to said organic phase greater than 0.9:1; and
  (f) polymerizing the mixture so prepared.

9. The method of claim 8, wherein said protective colloid is selected from the group consisting of hydroxyethyl cellulose, and polyvinyl pyrrolidone.

10. The method of claim 9, further comprising an inorganic powder insoluble in water associated with said protective colloid.

11. The method of claim 10, wherein said inorganic powder is tricalcium phosphate.

12. The method of claim 8, further comprising the addition of flame-retardant compounds.

13. The process of claim 9, wherein said protective colloid is polyvinyl pyrrolidone in a concentration of 0.01 to 0.2 part/100 parts of water having a K value of 30 to 90.

14. The process of claim 9, where said protective colloid is hydroxyethyl cellulose in a concentration of 0.01 to 0.2 part/100 parts of water.

* * * * *